United States Patent
Shimizu

[11] Patent Number: 6,131,043
[45] Date of Patent: Oct. 10, 2000

[54] LOCAL RADIO BASE STATION APPARATUS

[75] Inventor: Junko Shimizu, Yokohama, Japan

[73] Assignee: Matsushita Electric Industrial Co., Ltd., Osaka, Japan

[21] Appl. No.: 09/058,956

[22] Filed: Apr. 13, 1998

[30] Foreign Application Priority Data

May 16, 1997 [JP] Japan .................................. 9-143519

[51] Int. Cl.⁷ .................................................. H04B 1/38
[52] U.S. Cl. .......................... 455/561; 455/417; 455/445
[58] Field of Search .................................. 455/412, 414, 455/417, 445, 518, 561, 519

[56] References Cited

U.S. PATENT DOCUMENTS

| | | | |
|---|---|---|---|
| 4,284,848 | 8/1981 | Frost ........................................... | 179/2 |
| 5,457,809 | 10/1995 | Ohnishi .................................. | 455/33.1 |
| 5,555,553 | 9/1996 | Jonsson .................................. | 379/214 |
| 5,924,033 | 7/1999 | Carlsson et al. ........................ | 455/436 |

FOREIGN PATENT DOCUMENTS 4-46447  2/1992  Japan .

*Primary Examiner*—Thanh Cong Le
*Assistant Examiner*—C. Chow
*Attorney, Agent, or Firm*—Stevens, Davis, Miller & Mosher, L.L.P.

[57] ABSTRACT

A local radio base station apparatus having a local radio base station for connection by wireless communication links with plural public radio mobile stations and a public representative radio mobile station for connection by a wireless communication link with the local radio base station. When there is a call from a public line by a phone number of the public representative mobile station and an additional number, an additional number analyzer provides an output employed to switch a call link with the public representative mobile station to a call link with the public radio mobile station. A call for a public line given by the public radio mobile stations is locally accepted by the public representative radio mobile station. After the radio link is established, the local radio base station issues a request for a call to a network and then switches to the call link with the public radio mobile station after the identification is terminated. When there is a call by the phone number accompanied with an additional number, a voice processor controller is enabled to record a mail in the local radio base station.

3 Claims, 2 Drawing Sheets

LOCAL RADIO BASE STATION APPARATUS

BACKGROUND OF THE INVENTION

The present invention relates to a local radio base station which is capable of doing radio communications through a public representative radio mobile station.

Conventionally, the call given to and the origination from the public radio mobile station have merely allowed the call link with a radio mobile station with the original dialed phone number and the origination from the radio mobile station the user operated to do transmissions. However, in the event a user wishes to use his or her own public radio mobile station as a local mobile station for commercial use, a conventional local radio base station apparatus of this type has been disadvantageously required to make its own phone number open or be charged when the user operates to originate it.

SUMMARY OF THE INVENTION

The present invention is provided for overcoming the foregoing disadvantages, and it is an object of the present invention to provide a local radio base station apparatus which is arranged so that a personally owned public radio mobile station may be used for a commercial purpose with a help of the public representative radio mobile station.

In carrying out this object, according to an aspect of the invention, a local radio base station apparatus includes a public representative radio mobile station connected to a local radio base station by wireless, the local radio base station comprising a table for registering a phone number of the public representative radio mobile station, a local number table for registering a public number of each public radio mobile station and a local number allocated to the public number, call accepting means for accepting a call to the public representative radio mobile station after called from a public line by the phone number of the public representative radio mobile station of the local radio base station plus an additional number is received and when the received phone number of the public representative radio mobile station is matched to the phone number of the public representative radio mobile station registered in the table for registering the public representative radio mobile station, additional number analyzing means for determining whether the additional number is matched to the local number registered in the table for registering the local number after the matching identification is terminated, and a communication path for locally linking with the corresponding public radio mobile station by the local number when the analyzing means determines that they are matched and then switching the call link from the public representative radio mobile station to the public radio mobile station after responding to the local link.

According to an aspect of the invention, the personally owned public radio mobile station may be used or local business.

According to a first aspect of the invention, a local radio base station apparatus having a local radio base station connected by wireless with plural public radio mobile stations, includes a public representative radio mobile station connected by wireless with the local radio base station, the local radio base station comprising a table for registering a phone number of the public representative radio mobile station, a local number table for registering public numbers of the public radio mobile stations and local numbers allocated to the public numbers, call accepting means for accepting a call to the public representative radio mobile station after called from a public link by the public representative radio mobile station plus an additional number and when the phone number of the public representative radio mobile station is matched to the phone number of the public representative radio mobile station registered in the table for registering the public representative radio mobile station, additional number analyzing means for determining whether the additional number is matched to the local number registered in the local number table after the matching identification is terminated, and a communication path for locally linking with the corresponding public radio mobile station by the local number when the analyzing means determines that they are matched and switching the call link from the public representative radio mobile station to the public radio mobile station after responding to the local link. This invention makes it possible for the personally owned public radio mobile station to be used for local business without making the phone number open to a caller.

According to a second aspect of the invention, a local radio base station apparatus having a local radio base station connected by wireless with plural public radio base stations, includes a public representative radio mobile station connected by wireless with the local radio base station, the local radio base station comprising call accepting means for accepting a call from the public radio mobile station to the public representative radio mobile station on a local line when the public radio mobile station issues a calling request for a public line, a storage unit for temporarily storing a public number of the public radio mobile station having issued the calling request and a representative number of the public representative radio mobile station locally linked with the public radio mobile station, calling means for giving a call to a destination number requested by the public radio mobile station after establishing a public radio link of the public representative radio mobile station, and a communication path for switching the called link from the public representative radio mobile station to the public radio mobile station based on the public number of the caller stored in the storing unit after the matching identification is terminated. This invention makes it possible for the personally owned public radio mobile station to be used for local business without being charged with it.

According to a third aspect of the invention, the local radio base station apparatus further includes voice processor control means for, when the public number corresponding to the additional number is registered in the table for registering the local number when called by the phone number of the public representative radio mobile station plus the additional number, specifying the public number as a voice mail processor number, accepting a call from the public line by the local number and connecting a voice communication path with the voice processor. This invention provides a mail recording service within a specific local area where the public radio mobile station is in use.

DESCRIPTION OF THE PREFERRED EMBODIMENTS

Figure 1:
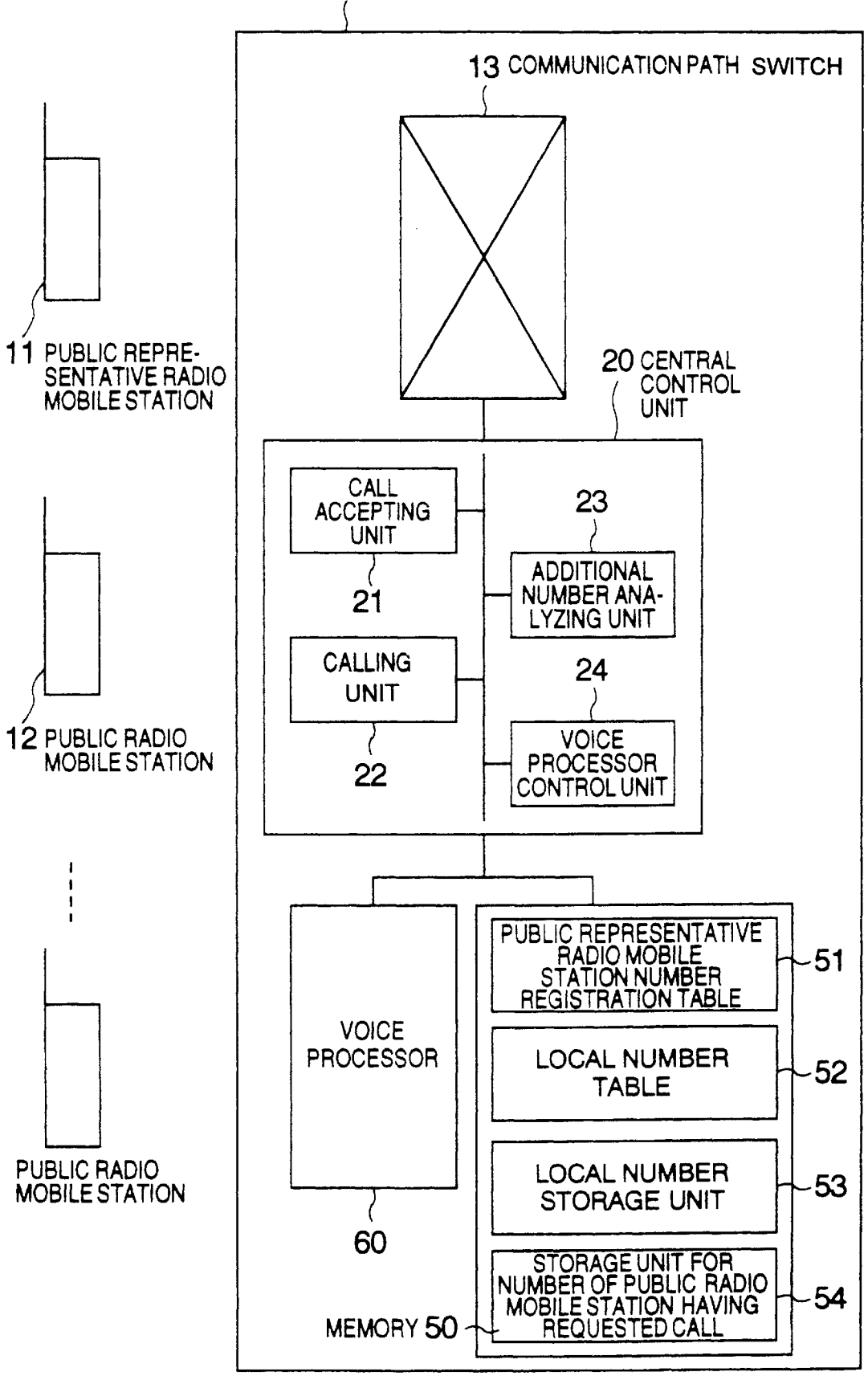
FIG. 1 is a block diagram showing an arrangement of a local radio base station apparatus according to an embodiment of the present invention.
Figure 2:
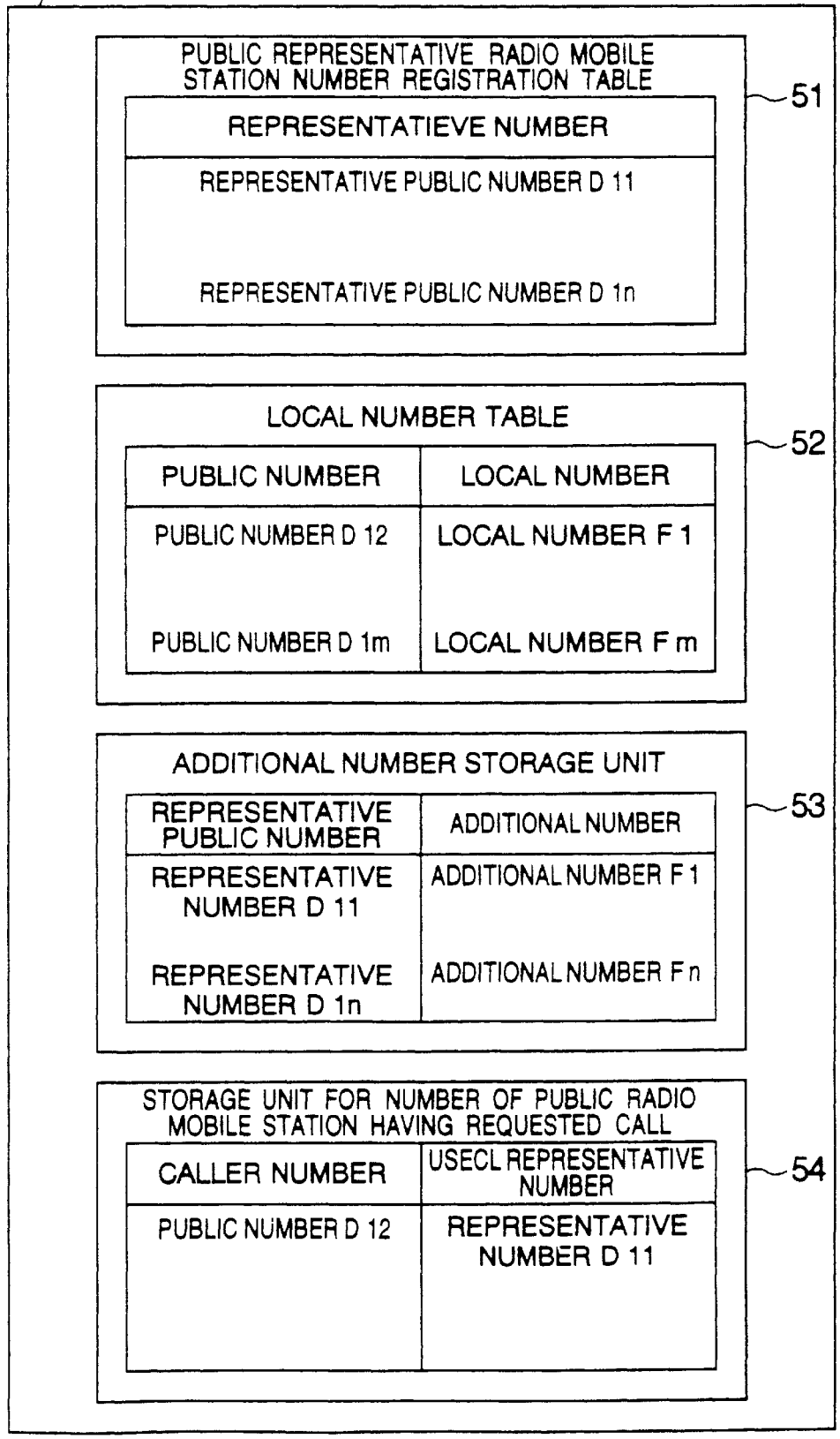
FIG. 2 is a view showing a registered content of a memory located in the local radio base station apparatus according to the present invention.

Hereinafter, an embodiment of the present invention will be described with reference to FIGS. 1 and 2. FIG. 1 is a block diagram showing an arrangement of a local radio base station apparatus according to an embodiment of the invention. FIG. 2 is an explanatory view showing a registered content of a memory included in the local radio base station according to the embodiment of the invention.

In FIG. 1, a numeral 10 denotes a local radio base station for local use. A numeral 11 denotes a public representative radio mobile station the location of which is registered under the control of the local radio base station 10. A numeral 12 denotes a plurality of personally owned public radio mobile stations. The public radio mobile station 12 is enabled to give a call or accept a call through the public representative radio mobile station 11. The local radio base station 10 includes a communication path switch 13, a central control unit 20 for controlling the whole of the local radio base station, a memory 60, and a voice processor 50, the latter two of which are connected to the central control unit 20.

The communication path switch 13 serves to form a communication path between a network side belonging to a public line and the public representative radio mobile station 11 and the public radio mobile station 12 both of which belong to a local line. The central control unit 20 includes a call accepting unit 21, a calling unit 22, an additional number analyzing unit 23, and a voice processor control unit 24. The memory 50 includes a table 51 for registering a phone number of the public representative radio mobile station, a local number table 52 for registering a local number, an additional number storing unit 53, and a storing unit 54 for storing a phone number of the public radio mobile station for giving a calling request.

In FIG. 2, the table 51 for registering the phone number of the public representative radio mobile station included in the memory 50 contains representative public numbers D11 to D1n of the public representative radio mobile station to be representatively called. The local number table 52 contains the phone numbers (public numbers) D12 to D1m of the public radio mobile station and the allocated local numbers F1 to Fm enabled under the control of the local radio base station 10. When called from the public line by the phone number of the public representative radio mobile station 11 plus the additional number, the additional number storing unit 53 operates to temporarily store the called number (representative public number) D11 to D1n and the corresponding additional numbers F1 to Fm. The storing unit 54 for storing the phone number of the public radio mobile station 12 for issuing a calling request operates to temporarily store the caller numbers (public number) D12 . . . of the public radio mobile station for issuing a call to the public line and the used representative numbers D11 . . . of the used public representative radio mobile station.

Now, the description will be oriented to the operation of the local radio base station apparatus according to an embodiment of the invention.

First, when called from the public line by the phone number of the public representative radio mobile station plus the additional number, the central control unit 20 operates to match the called number to the numbers registered in the table 51 and determine whether it is matched to any one of the numbers. When matched, the accompanied additional number F1 is temporarily stored in the additional number storing unit 53. Then, the call accepting unit 21 performs an operation of linking a call with the public representative radio mobile station 11. After the matching identification is terminated, the additional number analyzing unit 23 operates to determine whether the additional numbers F1 stored in the additional number storing unit 53 are matched to the local numbers registered in the local number table 52. Only when one match takes place, the corresponding public radio mobile station 12 is locally called by the public number D12. After the station 12 responds to the call, the communication path switch 13 operates to switch the call link from the public representative radio mobile station 11 to the public radio mobile station 12. The radio link of the public representative radio mobile station 11 is made open when the foregoing identification is terminated. However, the called state in the local radio base station 10 is held until the call link of the public radio mobile station 12 is cut off.

The foregoing operation makes it possible for the personally owned public radio mobile station 12 to be used for local business without making the phone number of the mobile station 12 open to the calling person.

On the other hand, when the public radio mobile station 12 operates to issue a calling request for the public line, first, the public representative radio mobile station 11 is locally called by the requesting mobile station 12. At this time, the storing unit 54 for storing the phone number of the public radio mobile station 12 for requesting a call operates to store the phone number D12 of the public radio station 12 having requested a call to the public line and the phone number D11 of the public representative radio mobile station 11 having being locally called. After establishing the radio link of the public representative radio mobile station 11 with the public line, the local radio base station 10 enables the calling unit 22 to give a call to the destination phone number requested to be called by the public radio mobile station 12. After the identification is terminated, the public radio mobile station 12 operates to retrieve the public radio mobile station number D11 of the mobile station having requested the call, stored in the storing unit 54 and enables the communication path switch 13 to switch the call link from the public representative radio mobile station 11 to the public radio mobile station 12.

The radio link of the public representative mobile station 11 is made open at a time when the foregoing identification is identified. However, the called state in the local radio base station 10 is held until the call link of the public radio mobile station 12 is cut off.

The above series of operations make it possible for the personally owned public radio mobile station 12 to be used for local business without being charged with it.

In the foregoing case that there is a call from the public line by the phone number of the public representative mobile station plus the additional number, when the public number registered in the local number table 52, which corresponds to the local number matched to the additional number F1, is a voice processor number, a voice communication path is connected with the voice processor through the effect of the voice processor control unit 24.

This function provides a mail recording service in a specific local area where the public radio mobile station is in use.

As set forth above, the local radio base station apparatus according to the present invention provides the public representative radio mobile station in the local radio base station so that the calling from the personally owned public radio mobile station or the called thereby is realized through the public representative radio mobile station. At the same time, the phone number of the personally owned public radio mobile station is not made open to the calling party when the mobile station may accept the call from the public line and further may be oriented to commercial use inside of the local area.

Moreover, the local radio base station apparatus according to the present invention prevents the personally owned public radio mobile station from being charged when the mobile station gives a call from the local area to the public line.

The local radio base station apparatus according to the present invention also provides a mail recording service inside of a specific local area where the public radio mobile station is in use by connecting the local radio base station to the voice processor.

What is claimed is:

1. A local radio base station apparatus having (i) a local radio base station for connection by wireless communication links with plural public radio mobile stations and (ii) a public representative radio mobile station for connection by a wireless communication link with said local radio base station, said local radio base station comprising:

a first table for registering a phone number of said public representative mobile station;

a second table for registering public phone numbers of said public radio mobile stations and local numbers allocated to said public ph one numbers;

call accepting means for accepting a call and establishing a first call link to said public representative radio mobile station when (i) said local radio base station is called from a public line by the phone number of said public representative radio mobile station and an additional number and (ii) the phone number of said public representative radio mobile station is matched to the phone number of said public representative radio mobile station registered in said first table for registering the phone number of said public representative radio mobile station;

additional number analyzing means for determining whether a match exists between said additional number and the local number registered in said second table; and a communication path switch for establishing a local call link enabling the public radio mobile station corresponding to said local number to be locally called by said local number when said additional number analyzing means determines that a match exists and for switching said first call link from said public representative mobile station to said public radio mobile station after responding to said local call link.

2. A local radio base station apparatus having (i) a local radio base station for connection by wireless communication links with plural public radio mobile stations and (ii) a public representative radio mobile station for connection by a wireless communication link with said local radio base station, said local radio base station comprising:

call accepting means for accepting a local call from said public radio mobile station to said public representative radio mobile station when said public radio mobile station issues a calling request for a public line to a destination phone number;

a storage unit for temporarily storing a public phone number of said public radio mobile station having issued said calling request for the public line and a representative number of said public representative radio mobile station having accepted the local call;

calling means for giving a call and establishing a call link to said destination phone number requested by said public radio mobile station after a radio link with said public representative radio mobile station is established; and a communication path switch for switching the call link from said public representative radio mobile station to said public radio mobile station based on the public phone number stored in said storage unit after said call is identified.

3. The local radio base station apparatus is claimed in claim 1, further comprising means for registering the public phone number corresponding to said additional number after said accepting means accepts said call and means for controlling a voice processor by specifying the public phone number as a voice mail service number, accepting a call from the public line by said number, and then connecting a voice communication path to said voice processor.

* * * * *